Patented June 21, 1938

2,121,616

UNITED STATES PATENT OFFICE 2,121,616

SULPHATES OF POLYBASIC ACID ESTERS

James Herbert Werntz, Wilmington, Del., assignor to E. I. du Pont de Nemours & Company, Wilmington, Del., a corporation of Delaware No Drawing. Application May 29, 1937, Serial No. 145,515

16 Claims. (Cl. 260—99.12)

This invention relates to new chemical compounds, their methods of manufacture, and their technical uses, and more particularly to the production and utilization of esters of sulphato-polycarboxylic acids having less than 15 carbon atoms with branched, open chain, aliphatic alcohols containing 6 or more carbon atoms.

This application is a continuation-in-part of my co-pending application, Serial Number 757,465, filed December 14, 1934, which has matured into Patent 2,104,782 dated Jan. 11, 1938.

This invention has as an object the preparation of a number of new chemical compounds which have surface active properties. A further object is to manufacture these new chemical compounds by novel and easily conducted processes from relatively inexpensive raw materials. A still further object is to apply these new compounds in various connections wherein surface active compounds are commonly employed. Other objects will appear hereinafter.

These objects are accomplished by the following invention which relates in a general way to the production of esters of sulphato-polycarboxylic acids having less than 15 carbon atoms with branched, open chain, aliphatic alcohols having 6 or more carbon atoms, said esters having the sulphate group on the acid residue. In the preferred embodiment, these objects are accomplished by the production of esters of aliphatic sulphato-polycarboxylic acids having less than 15 carbon atoms with branched, open chain, aliphatic alcohols having 6 or more carbon atoms, said esters having the sulphate group attached directly to a carbon atom on the acid residue which is attached directly to at least two other carbon atoms.

The following examples will serve to illustrate this invention.

Example 1

Sodium salt of bis(2-ethylhexyl) sulphato-succinate.—Solutions were prepared consisting of 7.2 parts by weight of undistilled bis(2-ethylhexyl)-malate dissolved in 14.5 parts by weight of dry ethyl ether and of 2.3 parts by weight of chlorosulphonic acid dissolved in 14.5 parts by weight of dry ethyl ether. The solution of the acid was added slowly with stirring to the solution of the ester, maintaining the temperature at 0° C. during the addition of the acid. Stirring was continued, and the temperature was allowed to rise to 10° C. during 1½ hours, at the end of which time a test sample gave a foaming solution in water. The reaction mixture was poured on to 100 parts by weight of ice, neutralized with 4% sodium hydroxide solution using phenolphthalein as the indicator, 250 parts by weight of water was added, the solution shaken with an additional 36.5 parts by weight of ethyl ether, and then allowed to stand overnight. The ether layer was separated, and the ether evaporated on the steam bath, yielding 8.7 parts by weight of a light colored, sticky gel which was very soluble in water. The neutralized product probably has the following structural formula:

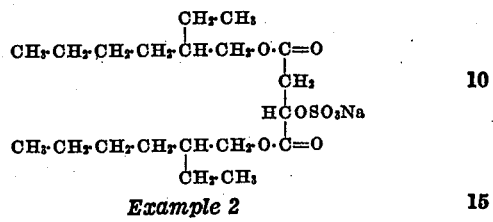

Example 2

Sodium salt of bis(2-ethylhexyl) sulphato-succinate.—14.4 parts by weight of distilled bis(2-ethylhexyl) malate was dissolved in 28.8 parts by weight of dry ethyl ether. To this solution was added slowly a solution of 4.7 parts by weight of chlorosulphonic acid dissolved in 28.8 parts by weight of anhydrous ethyl ether. The temperature was maintained at about 0° C. during the addition of the acid, and stirred for 2 hours during which time the temperature rose to 10° C. The reaction mixture was poured on to 200 parts by weight of ice and neutralized with 81 parts by weight of a 4% sodium hydroxide solution. The ether layer, after standing overnight, was separated, and the ether evaporated at room temperature. The product was dried over phosphorus pentoxide under vacuum to constant weight. 17.5 parts by weight of a white solid was obtained which dissolved readily in water and wet powdered sulphur very rapidly. This product was a highly efficient wetting agent for cotton goods. The neutralized product probably has the same structural formula as the product of Example 1.

Example 3

Sodium salt of bis(2-ethylhexyl) sulphato-succinate.—5.84 parts by weight of chlorosulphonic acid was added slowly from a dropping funnel to 17.9 parts by weight of distilled bis(2-ethylhexyl) malate contained in a 3-neck flask equipped with a stirrer and a calcium chloride drying tube. The acid was added during 30 minutes and the temperature was maintained at about 0° C. Stirring was continued 40 minutes longer at which time the product was completely soluble in water. The product was poured on to 200 parts by weight of ice and neutralized with 90 parts by weight of 4% sodium hydroxide solution. The solution was next extracted with three portions of ethyl ether separating the ether layer after each extraction. The ether extracts were combined, dried with sodium sulphate and filtered. The dry ether solution was next evaporated at room temperature and the solid product finally dried over phosphorus pentoxide at 5 mm. to constant weight. 19.4 parts by weight of a soft, white, waxy solid was obtained which analyzed 6.23% sulphur, indicating a purity of 89.5%. The neutralized product probably has the same structural formula as the product of Example 1.

Example 4

Sodium salt of bis(2,4-dimethyl pentyl-1)sulphato-succinate.—To a solution consisting of 16.5 parts by weight of bis(2,4-dimethyl pentyl-1)malate (boiling point 170° C. at 3 mm.) in 35 parts by weight of dry ethyl ether was added with stirring a solution of 6.4 parts by weight of chloro-sulphonic acid in 35 parts by weight of anhydrous ethyl ether. The acid was added during a period of 30 minutes during which time the temperature was maintained at 0° C. Stirring was continued for 3 hours during which time the temperature was allowed to rise to 15° C. The reaction mixture was poured on to 200 parts by weight of ice, neutralized with 4% aqueous sodium hydroxide, and the mixture then extracted with ethyl ether. The ether layer was separated, dried with anhydrous sodium sulphate, and the ether removed by evaporation at room temperature. After drying over phosphorus pentoxide at 5 mm. pressure, 19 parts by weight of a soft, white, waxy, solid, which was soluble in ethyl ether and water, was obtained. The product thus obtained analyzed 7.2% sulphur indicating a purity of 96.5%.

Example 5

The sodium salt of bis(2-ethylhexyl)hydroxy-sulphato-succinate was prepared by treating 18.7 parts by weight of bis(2-ethylhexyl)tartrate (boiling point 198° C. at 2 mm.) with 6.4 parts by weight of chlorosulphonic acid according to the procedure described in Example 4. The sodium salt thereby obtained was a soft, translucent, gummy, solid which was readily soluble in ethyl ether and in water. The product analyzed 5.8% sulphur indicating a purity of 86.5%.

Example 6

Sodium salt of bis(2-ethyl hexenyl)sulphato-succinate.—Bis(2-ethyl hexenyl)malate (boiling point 170–175° C. at 2 mm.) was dissolved in dry ethyl ether and sulphated by adding a dry ethyl ether solution of chlorosulphonic acid thereto. The sulphated malate ester was neutralized with sodium hydroxide, and the product isolated and purified as in Example 4. The sodium salt thereby obtained was a soft solid which was readily soluble in ethyl ether and in water.

Example 7

Sodium salt of the sulphuric acid ester of bis(2-ethylhexyl)mucate. — Bis(2-ethylhexyl)mucate (melting point 95–97° C.) was dissolved in dry ethyl ether and sulphated by adding a dry ethyl ether solution of chlorosulphonic acid thereto. The sulphated mucate ester was neutralized with sodium hydroxide. The sodium salt thereby obtained was a soft yellow solid which was readily soluble in ethyl ether and in water.

Example 8

To a solution consisting of 16.5 parts by weight of the mixture of dialkyl malates having a boiling point of 155° C. at 2 mm. (prepared by esterifying malic acid with a fraction boiling from 150–160° C. of the mixture of higher aliphatic alcohols obtained in the catalytic synthesis of methanol from carbon monoxide and hydrogen and containing large proportions of 2,4-dimethyl pentanol-1 and 2,4-dimethyl hexanol-3) in 70 parts of anhydrous ethyl ether was added with stirring a solution of 6.4 parts by weight of chlorosulphonic acid in 70 parts of anhydrous ethyl ether. The acid was added during the course of 3 hours during which time the temperature of the mixture was maintained at 0° C. The reaction mixture was poured on to 200 parts by weight of ice, neutralized with 4% aqueous sodium hydroxide solution, and then extracted with ethyl ether. The ether layer was separated, dried over anhydrous sodium sulphate, filtered, and the ether then evaporated at room temperature. After drying over phosphorus pentoxide at reduced pressure, 18.9 parts of a light yellow waxy, solid which was readily soluble in ethyl ether and water was obtained. The product thus obtained analyzed 7% sulphur, indicating a purity of 94.5%.

Example 9

To a solution consisting of 17.9 parts by weight of the mixture of dialkyl malates having a boiling point above 150° C. at 3 mm. (prepared by esterifying malic acid with a fraction boiling from 160–175° C. of the mixture of higher alcohols obtained in the catalytic synthesis of methanol from carbon monoxide and hydrogen, and containing large proportions of 4-methyl hexonal-1 and 2,4-dimethyl hexanol-1) in 70 parts of anhydrous ethyl ether was added 6.4 parts by weight of chlorosulphonic acid under the conditions described in Example 8. The mixture of sulphated malate esters thus obtained was neutralized with an aqueous 4% solution of sodium hydroxide and the product isolated and purified as in Example 8. The mixture of sodium salts thereby obtained was a soft, brown, transparent, waxy, solid which was readily soluble in ethyl ether and in water. The yield was 20 parts by weight. Analysis showed the product to contain 6.35% sulphur indicating a purity of 91.6%.

Example 10

A dialkyl malate having a boiling point above 150° C. at 2 mm. was prepared by esterifying malic acid with a fraction boiling from 180–183° C. of the mixture of higher aliphatic alcohols obtained in the catalytic synthesis of methanol from carbon monoxide and hydrogen. This fraction of these alcohols contains large proportions of 4- or 5-methyl heptanol-1. 17.9 parts by weight of the dialkyl malate thus obtained was dissolved in 70 parts by weight of anhydrous ethyl ether and sulphated by addition of 6.4 parts by weight of chlorosulphonic acid under the conditions described in Example 8. The mixture of sulphated esters thus obtained was neutralized with an aqueous 4% solution of sodium hydroxide, and the product isolated and purified as described in Example 8. 16 parts by weight of a brown, viscous, liquid which was readily soluble in ethyl ether and water was obtained. Analysis of the product showed it to contain 5.9% sulphur, indicating a purity of 84.4%.

Example 11

A mixture of dialkyl malates having a boiling point above 130° C. at 10 mm. was prepared by esterifying malic acid with a fraction boiling from 180–200° C. of the mixture of higher aliphatic alcohols obtained in the catalytic synthesis of methanol from carbon monoxide and hydrogen. This fraction of these alcohols contains some 4- or 5-methyl heptanol-1 and various unidentified primary and secondary branched, open chain, alcohols of higher carbon content. 19.3 parts by weight of this mixture of dialkyl malates dissolved in 70 parts of anhydrous ethyl ether was sulphated by adding thereto 6.4 parts by weight of chlorosulphonic acid as described in Example 8. The mixture of sulphated malate esters was neutralized with an aqueous 4% solution of sodium hydroxide, and the product isolated and purified as in Example 8. The mixture of sodium salts thereby obtained was a brown, viscous, liquid which was readily soluble in ethyl ether and in water. The yield of product was 22.4 parts by weight, and analysis thereof showed it to contain 4.2% sulphur, indicating a purity of 64%.

*Example 12*

A mixture of dialkyl malates boiling from 170–220° C. at 3 mm. was prepared by esterifying malic acid with a fraction boiling from 200–275° C. of the mixture of higher aliphatic alcohols obtained in the catalytic synthesis of methanol from carbon monoxide and hydrogen. This fraction of these alcohols contains a mixture of primary and secondary branched, open chain, alcohols of high molecular weight. 22.1 parts by weight of this mixture of dialkyl malates dissolved in 70 parts by weight of anhydrous ethyl ether was sulphated by adding thereto 6.4 parts by weight of chlorosulphonic acid. The mixture of sulphated malate esters thus obtained was neutralized with an aqueous 4% solution of sodium hydroxide, and the product isolated and purified as in Example 8. 25.5 parts by weight of a brown, viscous, liquid which was soluble in ethyl ether were obtained. Analysis of the product showed it contained 5% sulphur, indicating a purity of 89%. The potassium salt was similarly prepared and was a soft, yellow, waxy solid, which was soluble in ether. Both products dissolve in water to give foaming solutions which wet powdered sulphur very readily.

Tests by the Draves and Clarkson method (American Dyestuffs Reporter 20, 201 (1931)) have shown that the sulphated esters described above are a superior class of wetting agents. The products described in Examples 1, 2, 3, 4, 8, and 10 are very highly efficient wetting agents. The products described in Examples 9, 11, and 12 are also highly efficient wetting agents which are but slightly inferior to the products mentioned in the preceding sentence.

The esters which are to be sulphated may be prepared from any branched, open chain aliphatic alcohol containing 6 or more carbon atoms. In the case of malic acid esters, it is preferred that the alcohol contain at least 5 carbon atoms in a straight chain. The alcohols employed in the practice of this invention are preferably saturated, although it is contemplated that unsaturated alcohols such as 2-ethyl hexanol-1 may also be used. The alcohol employed may be primary, secondary, or tertiary. I generally prefer to prepare the esters to be sulphated from primary alcohols or from mixtures of primary and secondary alcohols. Suitable primary alcohols for use in this connection are 2-methyl pentanol-1; 4-methyl pentanol-1; 2,4-dimethyl pentanol-1; 2-methyl hexanol-1; 2,4-dimethyl hexanol-1; 2-ethyl hexanol-1; 4-methyl heptanol-1; 5-methyl heptanol-1; 4,6-dimethyl heptanol-1; 2,6-dimethyl octanol-1; 2,4,6-trimethyl octanol-1; 2-ethyl 4,6-dimethyl octanol-1; 2,4,6-trimethyl decanol-1; 2-butyl octanol-1, and 2,4,6,8-tetramethyl decanol-1. Of the various primary alcohols mentioned in the preceding sentence, I prefer to use 2-ethyl hexanol-1 to prepare the esters which are to be sulphated. Suitable secondary alcohols for use in this connection are: 7-ethyl 2-methyl undecanol-4; 5-ethyl nonanol-2; 5,11-diethyl pentadecanol-8; 2-methylpentanol-3; 2,4-dimethyl pentanol-3; 2,4-dimethyl hexanol-3; 3-ethyl heptanol-6; 3,9-diethyl undecanol-6; 3-ethyl-9-methyl nonanol-6; 3-methyl hexanol-2; 3-methyl heptanol-2; 3-ethyl undecanol-6; 3,9-diethyl tridecanol-6; 5-methyl octanol-3; and 3-ethyl nonanol-2. A preferred class of alcohols for use in the practice of this invention are the mixtures of branched, open chain, aliphatic alcohols containing 6 or more carbon atoms which are obtained in the catalytic synthesis of methanol from carbon monoxide and hydrogen. The nature of the higher alcohol mixtures obtained in the catalytic synthesis of methanol is more fully described by Graves in "Industrial and Engineering Chemistry" 23, 1381 (1931). Many of the alcohols mentioned in this paragraph are constituents of the mixture of higher alcohols obtained in the synthesis of methanol. It therefore follows that, in place of individual alcohols, I may use mixtures thereof, the various components of which may vary from traces to major fractions. The use of mixtures is frequently desirable since some alcohol mixtures are cheaper than the individual alcohols contained therein.

The esters which are to be sulphated may be prepared from any polycarboxylic acid containing less than 15 carbon atoms and at least one sulphatable double linkage or hydroxyl group. Hydroxy polycarboxylic acids containing from 3 to 6 carbon atoms are preferred in preparing the esters which are to be sulphated. Examples of such acids are tartronic, malic, tartaric, alpha hydroxy glutaric, beta hydroxy glutaric, alpha hydroxy adipic, trihydroxy glutaric, saccharic, mucic, etc. Of the hydroxy polycarboxylic acids, those preferred for the preparation of wetting agents are the monohydroxy dicarboxylic, particularly malic acid. Esters of polycarboxylic acids containing tertiary hydroxyl groups, e. g., citric acid may be, but generally are not, used in the practice of this invention, because their sulphates are less stable than those of esters of polycarboxylic acids containing secondary hydroxyl groups. Unsaturated polycarboxylic acids, e. g., maleic, fumaric, glutaconic, aconitic, itaconic, and muconic may also be used but are less preferred because their esters are more difficult to sulphate completely than those of the hydroxy polycarboxylic acids. The use of hydroxy aromatic polycarboxylic acids, e. g., hydroxy phthalic is contemplated within the scope of this invention, but is not one of its preferred embodiments.

Esters which are to be sulphated may be prepared from the alcohols and acids mentioned in the preceding paragraphs by any appropriate method of esterification. Bis(2-ethylhexyl) malate, which is used in preparing the products described in Examples 1 to 3, may be prepared by the method which is disclosed in my co-pending application, Serial Number 139,939 filed April 30, 1937. Dialkyl malates, such as those used in preparing the products described in Examples 4, and 8 to 12, may be made by methods similar to those set forth in U. S. Patents 2,015,077 and 2,015,088. Usually, the esters to be sulphated are prepared by esterifying all of the carboxyl groups of the particular polycarboxylic acid employed with a branched, open chain, alcohol containing 6 or more carbon atoms. Esters which are to be sulphated may also be made in which only one carboxyl group has been esterified by a branched, open chain, aliphatic alcohol and the other carboxyl group is either free or combined as a salt, amide, etc. In the case of a dicarboxylic acid, it is preferable to esterify both of the carboxyl groups with a branched chain aliphatic alcohol which contains at least 6 carbon atoms. Each of the carboxyl groups may be esterified with the same or with different branched chain alcohols. In the case of the esters employed for making the products described in Examples 1 to 7, both of the carboxyl groups of the acid have been esterified with the same branched chain alcohol. When the dicarboxylic acid is esterified with a mixture of branched chain alcohols as occurs in the preparation of the starting esters used in Examples 8 to 12, it is probable that a considerable proportion of the esters thereby obtained have the hydrogens of the carboxyl groups replaced by different branched chain alkyl radicals. This invention further embraces an embodiment in which the esters to be sulphated are obtained by esterifying at least one carboxyl group of a polycarboxylic acid with a branched, open chain, aliphatic alcohol containing at least 6 carbon atoms and the other carboxyl group is esterified with a dissimilar alcohol such as ethanol, butanol, cyclohexanol, normal octanol, octanol-2, etc. I generally prefer to prepare the esters which are to be sulphated by esterifying both of the carboxyl groups of a hydroxy dicarboxylic acid containing from 3 to 6 carbon atoms—especially malic acid—with a branched, open chain, aliphatic alcohol containing 6 or more carbon atoms.

Esters of hydroxy polycarboxylic acids are preferably sulphated with chlorosulphonic acid, while esters of the unsaturated acids, e. g., bis(2-ethylhexyl)maleate may be sulphated with sulphuric acid monohydrate, sodium acid sulphate, or sodium pyrosulphate under special conditions.

The sulphation may be carried on in the absence of solvents, as illustrated by Example 3, or in the presence of such diluents as ethyl ether, carbon tetrachloride, trichloroethylene, symmetrical dichloro-ethyl ether, acetic anhydride, etc.

While I generally prefer to neutralize the sulphated esters with sodium hydroxide in order to obtain their sodium salts, I may also use sodium carbonate, potassium hydroxide, ammonium hydroxide or some other basic reagent for neutralization. By appropriate methods, I may also convert these sulphated esters into their calcium, magnesium, aniline, pyridine, piperidine, cyclohexylamine, dimethylamine, ethylamine, triethanolamine, isobutylamine, glucamine, etc, salts. These sulphated esters may also be used whether the acid hydrogen of the sulphate group is neutralized or not.

The term "esters of sulphato-polycarboxylic acids" as used in the description and claims is to be understood to refer generically to the sulphated esters comprehended by the present invention irrespective of whether or how the sulphated esters may be neutralized.

By the expression "ester of a sulphato-polycarboxylic acid", I refer to esters in which a neutralized or unneutralized sulphate group is attached to a carbon atom on the acid residue.

The new compositions covered in this case belong to the class of surface active or capillary active materials in that they have colloidal properties and may therefore, be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with suitable detergents for cleansing and scouring vegetable and animal fibers when removing fatty or oily materials. When added to flax retting baths, they function as wetting and penetrating agents. They may be employed as assistants in fulling and felting processes. They may be used in sizing preparations in combination with the usual materials such as starches or gelatine or their equivalents, clays, talcs, weighting salts such as magnesium sulphate or calcium chloride, oils and oils processed by oxidization, polymerization, sulphonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, waterproofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulphur dyes in a finely divided condition. As penetrants and wetting agents they assist in producing level dyeings in neutral, acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber.

In the leather industry, these compositions function as useful wetting agents in soaking, deliming, bating, tanning, and dyeing baths. They are useful in softening and treating baths for hides and skins, particularly in baths used for fat-liquoring leather. Solutions of these compounds are useful for pretreating leather prior to dyeing.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of cosmetic preparations such as cold creams and lip sticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, slightly acid, or slightly alkaline liquors. They may be used for paint, varnish, and lacquer cleaners. They may advantageously be employed as cleansing agents in hard water and where a fatty or oily film resists the ordinary cleansing media. They may be added to soap in hard water baths, since these compositions do not form precipitates so readily in hard waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used to stabilize rubber latex. They may also be used as frothing and collecting agents in ore flotation processes, and in other processes such as the recovery of fixed oil from the oil sands. These compounds may be used in toothpaste, non-spattering margarines and may be employed as emulsifying agents for synthetic rubber latex such as "Duprene".

The above description and examples are to be taken as illustrative only. Any variation or departure therefrom which conforms to the spirit of the invention is intended to be included within the scope of the claims.

I claim:

1. An ester of a sulphato-polycarboxylic acid having less than 15 carbon atoms with a branched, open chain, aliphatic alcohol containing at least 6 carbon atoms.

2. An ester of an aliphatic sulphato-polycarboxylic acid having less than 15 carbon atoms with a branched, open chain, aliphatic alcohol containing at least 6 carbon atoms, the sulphate group in said ester being directly attached to a carbon atom on the acid residue which is attached directly to at least two other carbon atoms.

3. An alkyl ester of an aliphatic sulphato-polycarboxylic acid containing from 3 to 6 carbon atoms wherein the alkyl group is a branched, open chain containing at least 6 carbon atoms.

4. An alkyl ester of an aliphatic sulphato-dicarboxylic acid containing from 3 to 6 carbon atoms wherein the alkyl radical comprises a branched, open chain containing at least 6 carbon atoms.

5. A salt of a dialkyl ester of an aliphatic sulphato-dicarboxylic acid containing from 3 to 6 carbon atoms wherein the alkyl radical is a branched, open chain alkyl group containing at least 6 carbon atoms.

6. An alkali metal salt of a dialkyl ester of an aliphatic sulphato-dicarboxylic acid, said acid containing 4 carbon atoms, and said alkyl radicals being branched, open chain alkyl groups containing at least 6 carbon atoms.

7. An alkali metal salt of a dialkyl sulphato-succinate wherein the alkyl radicals are branched, open chain alkyl groups containing at least 6 carbon atoms.

8. A process of making an alkali metal salt of a dialkyl sulphato-succinate as claimed in claim 7 which comprises sulphating a dialkyl malate wherein the alkyl radicals are branched, open chain alkyl groups containing at least 6 carbon atoms with chlorosulphonic acid, and neutralizing the sulphated dialkyl malate with a solution of an alkali metal hydroxide.

9. A dialkyl ester of a sulphato-succinic acid wherein the alkyl radicals are branched, open chain alkyl groups containing at least 6 carbon atoms.

10. A bis(2-ethylhexyl) ester of a sulphato-succinic acid.

11. An alkali metal salt of bis(2-ethylhexyl)-sulphato-succinate.

12. The sodium salt of bis(2-ethylhexyl)sulphato-succinate.

13. A process of making the sodium salt of bis(2-ethylhexyl)sulphato-succinate which comprises sulphating bis(2-ethylhexyl)malate by means of chlorosulphonic acid and then neutralizing the sulphated malate ester by means of sodium hydroxide.

14. A dialkyl ester of sulphato-succinic acid wherein the alkyl groups are derived from a fraction of the mixture of branched, open chain alcohols containing at least 6 carbon atoms which are obtained in the catalytic synthesis of methanol from carbon monoxide and hydrogen.

15. An alkali metal salt of a dialkyl sulphato-succinate wherein the alkyl groups are derived from a fraction of the mixture of branched, open chain alcohols containing at least 6 carbon atoms which are obtained in the catalytic synthesis of methanol from carbon monoxide and hydrogen.

16. An alkali metal salt of bis(2,4-dimethylpentyl-1)sulphato-succinate.

JAMES HERBERT WERNTZ.